US009434274B2

(12) United States Patent
Kagerer

(10) Patent No.: US 9,434,274 B2
(45) Date of Patent: Sep. 6, 2016

(54) SPEED CONTROL SYSTEM FOR MOTOR VEHICLES

(71) Applicant: Bayerische Motoren Werke Aktiengesellschaft, Munich (DE)

(72) Inventor: Walter Kagerer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 149 days.

(21) Appl. No.: 14/261,118

(22) Filed: Apr. 24, 2014

(65) Prior Publication Data

US 2014/0324258 A1 Oct. 30, 2014

(30) Foreign Application Priority Data

Apr. 25, 2013 (DE) ........................ 10 2013 207 539

(51) Int. Cl.
*B60L 15/00* (2006.01)
*B60L 15/10* (2006.01)
*B60W 50/08* (2012.01)
*B60W 30/16* (2012.01)
*B60W 30/18* (2012.01)

(52) U.S. Cl.
CPC ............... *B60L 15/10* (2013.01); *B60W 30/16* (2013.01); *B60W 50/082* (2013.01); *B60L 2240/42* (2013.01); *B60W 30/18072* (2013.01); *B60W 2030/1809* (2013.01); *B60W 2710/105* (2013.01)

(58) Field of Classification Search
CPC .. B60W 10/08; B60W 30/16; B60W 50/082; B60W 30/18072; B60W 2030/1809; B60W 2710/105; B60W 30/143; B60W 30/18172; B60W 40/06; B60L 15/10; B60L 2240/42
See application file for complete search history.

(56) References Cited

U.S. PATENT DOCUMENTS 5,713,428 A * 2/1998 Linden ................. B60K 31/047 180/177
6,339,740 B1 * 1/2002 Seto ..................... B60K 31/047 340/904
6,637,534 B2 * 10/2003 Barbehoen ........... B60K 31/185 180/170
7,117,077 B2 * 10/2006 Michi et al. .................... 701/96
7,308,961 B2 * 12/2007 Satou ..................... B60K 31/04 180/170
7,343,897 B2 * 3/2008 Katrak et al. ................. 123/350
8,380,419 B2 * 2/2013 Sauter ................ B60W 30/143 701/110

(Continued)

FOREIGN PATENT DOCUMENTS

DE 102 05 023 A1 1/2004
DE 10 2008 027 120 A1 12/2009

(Continued)

OTHER PUBLICATIONS

German Search Report with English translation dated Jan. 24, 2014 (Eleven (11) pages).

*Primary Examiner* — Tuan C. To
(74) *Attorney, Agent, or Firm* — Crowell & Moring LLP

(57) ABSTRACT

A speed control system for a motor vehicle has an electronic control device which generates actuation signals for controlling the speed of the motor vehicle to a specified desired speed, and a control element, on the actuation of which an intervention which influences the speed control is performed. The control element is designed in the form of a button. When the button is pressed, the system intervenes in the active speed control for the time for which the button is pressed in such a way that no drive torque is generated. When the button is no longer pressed, the original speed control is resumed.

16 Claims, 1 Drawing Sheet p1l
T1
p1k
T2
p2
p1k, p1l
T3
p3
p2
p3
SG
a
b
A
B

(56) References Cited

U.S. PATENT DOCUMENTS 8,433,494 B2 * 4/2013 Vogel .................... B60W 10/06
701/1
2005/0006165 A1 * 1/2005 Scherl ................ B60K 31/0008
180/271
2007/0213905 A1 9/2007 Funk et al.
2010/0250087 A1 * 9/2010 Sauter ................ B60W 30/143
701/93

FOREIGN PATENT DOCUMENTS

DE 10 2012 205 263 A1 10/2013
EP 1 812 258 B1 3/2011

* cited by examiner

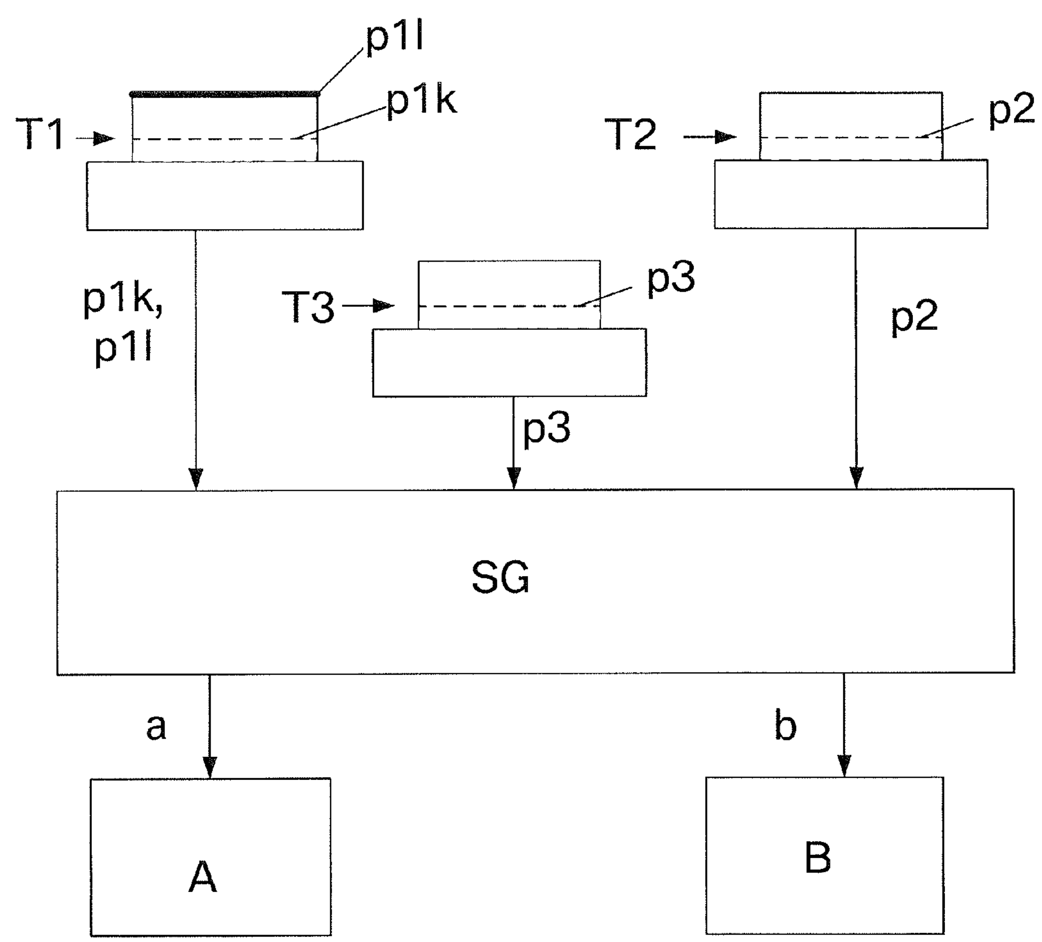
p1l
T1
p1k
T2
p2
p1k,
p1l
T3
p3
p2
p3
SG
a
b
A
B

SPEED CONTROL SYSTEM FOR MOTOR VEHICLES

CROSS REFERENCE TO RELATED APPLICATIONS

This application claims priority under 35 U.S.C. §119 from German Application No. 10 2013 207 539.1, filed Apr. 25, 2013, the entire disclosure of which is herein expressly incorporated by reference.

BACKGROUND AND SUMMARY OF THE INVENTION

The invention relates to a speed control system for a motor vehicle having an electronic control unit which generates actuation signals for controlling the speed of the motor vehicle at least to a specified desired speed, and having a control element, on the actuation of which an intervention which influences the speed control is performed.

Motor vehicles with speed control systems, also known as cruise control systems, have been known for a long time. Most speed control systems currently available control the speed of the motor vehicle to a specified desired speed. Alongside these road speed control systems, speed control systems enhanced by a separation control, also known as adaptive or active cruise control systems, can today also be purchased from some manufacturers. Here, in principle, the generally known speed control, which maintains a certain specified desired speed, is enhanced by an additional separation control function, thus enabling such a separation-related speed control to be also used in dense freeway and highway traffic. This so-called “separation-related speed control” holds the specified desired speed when the vehicle’s own lane is free. If a separation sensor attached to the motor vehicle, which in particular can work on a radar basis, detects a slower-moving target object or (motor) vehicle in front in the same lane, then the vehicle’s own speed is matched to the speed of the motor vehicle in front, for example by initiating a suitable braking torque, in such a way that a specified separation from the target object is maintained. In nose-to-tail traffic, such systems can sometimes control down to a standstill.

In principle, speed control systems can be switched on and off and temporarily deactivated by use of a control element which is arranged, for example, on the steering wheel or on the dashboard, or by use of a control lever which is arranged, for example, near the steering wheel. Further, the speed control can also be interrupted as a result of certain driving or driver maneuvers so that, in principle, the speed control system is still switched on, but the speed control is currently not implemented. An interruption of the speed control by switching to a so-called standby mode occurs, for example, when either the appropriate control element is actuated or when the driver actuates the brake pedal or the handbrake, or due to an automatic driving stabilization intervention. Although the speed control system is then still switched on, the control is not active.

In order to reactivate or resume the interrupted speed control to the previously specified desired speed, the driver must actuate an appropriate control element which, as a rule, is likewise arranged on the steering wheel or near the steering wheel. The speed control then controls once more to the previously stored desired speed. Alternatively, in the interrupted state, the speed control can be reactivated to the current speed as a new desired speed by actuating a further control element.

Further, EP 1 812 258 B1 discloses a driver assistance system with at least two operating modes, wherein the driver assistance system has a control element which activates a special safety operating mode of the driver assistance system for the time for which the control element is actuated.

A speed control system, with which at least one control element is designed in such a way that different functions are executed depending on the type of actuation, is also known. DE 10 2008 027 120 A1 therefore discloses a speed control system with a control element designed in the form of a touch-sensitive button which, when the button is pressed, reactivates the interrupted speed control to the stored desired speed and, when the button is touched, activates a display in which the stored desired speed and/or the stored separation is displayed or an appropriate display is enlarged. The display is active for a specified time.

Finally, the as yet unpublished DE 10 2012 205 263 A1 discloses a speed control system with a touch-sensitive button, wherein a first intervention which influences the speed control is generated when the button is pressed, and a second intervention which influences the active speed control is generated when the button is touched for the time for which the button is touched, and can be designed in such a way, for example, that no drive torque is generated for the time for which the button is touched.

The object of the invention is to provide a speed control system which is more user-friendly and more convenient with regard to its operation and which allows the driver to intervene quickly in the current speed control in a simple manner and, at the same time, is cost-effective.

This object is achieved by a speed control system for a motor vehicle having an electronic control device which generates actuation signals for controlling the speed of the motor vehicle at least to a specified desired speed, and having a control element, on the actuation of which an intervention which influences the speed control is performed. The control element is designed in the form of a button. When the button is pressed, the system intervenes in an active speed control for the time for which the button is pressed such that no drive torque is generated. When the button is no longer pressed, the original speed control is resumed.

The speed control system according to the invention is, therefore, based on an already known speed control system for motor vehicles having an electronic control unit which generates actuation signals for controlling the speed of the motor vehicle to a specified desired speed (and/or in the case of separation-related speed control systems, to a specified separation from a target object in front), and having at least one control element, on the actuation of which an intervention which influences the speed control is performed.

The invention is further based on the consideration that for anticipatory, efficient driving with a speed control system it is often necessary to deviate from the set speed, in particular to decelerate from the set speed in good time by freewheeling in overrun mode or coasting mode. Although one of the control operations mentioned at the outset (interruption by actuating a control element or by brake actuation) leads to the vehicle freewheeling, the speed control can only be reactivated by a renewed manual operating step (switching on by way of the control element).

The invention therefore provides at least one control element designed in the form of a button. When the button is pressed (for a longer time), the system intervenes in the active speed control for the time for which the button is pressed in such a way that no drive torque is generated. When the button is no longer pressed, the original active speed control is resumed. This temporary interruption enables the driver to compensate for the lack of anticipation and recognition of intention of a speed control.

For safety reasons, in spite of this, a required automatic braking intervention can also be performed during the partial interruption of the speed control as a result of pressing the button (at least a drive torque is generated). Alternatively however, the speed control can be completely interrupted for the time for which the button is pressed so that neither a braking torque nor a braking intervention is generated.

In order to be able to freewheel as soon as possible and therefore in an energy-saving manner, in the case of vehicles which are fitted with automatic transmission or automated gearboxes, not only is the speed control (at least partially) interrupted for the time for which the control element in the form of a button is pressed, but additionally a gearbox freewheel position is assumed (or the clutch disengaged) and the vehicle is operated in a so-called coasting mode. As a result, a decelerating torque brought about by overrun operation does not manifest itself either. When the button is no longer pressed, an appropriate, currently required gear is automatically selected once more or the disengaged clutch is engaged, and the speed control is activated in normal mode.

Advantageously, the control element in the form of a button can also be designed in such a way that (depending on the type of actuation) it has at least two different functions or exerts different types of influence on the speed control. The control element in the form of a button can therefore also be designed in such a way that a first intervention which influences the speed control is generated when the button is pressed briefly, and, when the button is pressed for longer period of time, the system intervenes in the active speed control for the time for which the button is pressed such that no drive torque is generated. At the end of the longer press of the button, the original speed control is resumed. The first intervention which influences the speed control is designed differently from the intervention when the button is pressed for a longer time, i.e. the speed control is influenced in a different way depending upon whether the button is pressed only briefly or for a longer time. Discrimination between short and longer pressing can be made, for example, in that a short press is detected when the button is actuated for less than a specified time interval of, e.g. 0.5 seconds.

At the same time, advantageously, the control element in the form of a button is a first control element for switching on, switching off and/or interrupting the speed control. When the button is pressed briefly, the control interrupts the active speed control, deactivates the interrupted speed control and/or activates the deactivated speed control. When the button is pressed for longer time period, the control intervenes in the active speed control for the time for which the button is pressed in such a way that at least no drive torque is generated. The vehicle is therefore operated in an overrun mode for the time for which the button is pressed. However, for safety reasons, an automatic brake intervention can again take place if this appears to be necessary or expedient.

Alternatively or in addition, the second control element, which is provided for specifying the current speed as the new desired speed, can also be in the form of such a button. When the button is pressed briefly and the speed control is active, the current desired speed is specified as the new desired speed and/or, if the speed control is interrupted, the speed control is activated to the current speed as the desired speed. When the button is pressed for longer time period, the system intervenes in the active speed control for the time for which the button is pressed in such a way that at least no drive torque is generated.

Likewise, alternatively or in addition, the third control element, which is provided for reactivating the interrupted speed control to the saved desired speed and/or the saved separation, can also be in the form of such a button. When the button is pressed briefly, the interrupted control of the speed to the stored desired speed and/or the stored separation is reactivated. When the button is pressed for longer time period, the system intervenes in the active speed control for the time for which the button is pressed in such a way that at least no drive torque is generated.

Similarly, with buttons designed in this way which carry out different interventions in the speed control depending on the time for which the button is actuated or pressed, the speed control can also be completely interrupted for the time for which the button is pressed so that neither a braking torque nor a braking intervention is generated.

In order to be able to freewheel as soon as possible and, therefore, in an energy-saving manner, in the case of vehicles equipped with an automatic transmission or an automated gearbox, not only is no drive torque (and possibly braking torque) generated for the time for which the appropriate button is pressed, but additionally a gearbox freewheel position is assumed (or the clutch disengaged) and the vehicle is operated in a so-called coasting mode. As a result, a decelerating torque brought about by the overrun operation does not manifest itself either. At the end of the longer button press, an appropriate, currently required gear is automatically selected once more or the disengaged clutch is engaged, and the normal speed control is resumed.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE is a schematic diagram of an exemplary speed control system having a control element in the form of button T1 for executing two functions of the speed control system.

DETAILED DESCRIPTION OF THE DRAWING

A speed control system with three buttons T1, T2 and T3, which are part of an active speed control system, is shown in the FIGURE. The speed control system further includes an electronic control unit SG which, in unrestricted driving, in a known manner controls the speed to a specified desired speed and, in nose-to-tail traffic (vehicle in front travelling slower than the specified desired speed), controls the speed to achieve a specified separation from the vehicle in front. Here, the speed is controlled in such a way that the control device SG either transmits a drive torque signal "a" to a drive unit A to accelerate the vehicle or a braking signal "b" to a braking unit B to decelerate the vehicle.

The first control element T1 is in the form of a button T1 such that, when the button T1 is pressed briefly p1k: (a) in the active state of the speed control, the active speed control is interrupted, (b) in the interrupted state, the interrupted speed control is deactivated, and (c) in the deactivated state, the deactivated speed control is activated. However, if the button T1 is pressed for a longer time period by the user (=p1l), as a result of the signal p 1l transmitted to the electronic control unit SG (or determined in the electronic control unit SG), the system intervenes in the active speed control for the time for which the button T1 is pressed such that no drive torque a is generated. In addition, the transmission of power between the engine and drive wheels could also be interrupted so that the vehicle coasts. If, however, the separation from a vehicle in front falls below a specified minimum separation (e.g., if the vehicle in front brakes hard), a braking signal b to decelerate the vehicle is also output to the braking unit B. At the end of the longer press of the button T1, the previously active speed control is resumed with the applicable desired speed and the applicable separation. Here, a short press of the button T1 may either be detected directly by the button T1 and an appropriate signal p1k is transmitted to the control unit, or the time for which the button T1 is pressed may be detected by a control unit evaluation—as a result of the signal p1k transmitted to the electronic control unit SG (or determined in the electronic control unit SG).

Further, the second control element is in the form of a simple button T2, wherein, when the button T2 is pressed p2, as a result of the signal p2 being transmitted to the electronic control unit SG, when the speed control is active, the current desired speed is specified as the new desired speed and the system controls thereto, and, when the speed control is interrupted, the speed control is reactivated with the current speed as the new desired speed. For completeness, a third control element T3 is also shown, this being in the form of a simple button T3 which, when the button T3 is pressed, transmits a signal p3 to electronic the control unit SG, which thereupon reactivates the interrupted control of the speed to the stored desired speed and/or the stored separation.

As a result of the speed control system according to the invention, reduced control effort is therefore necessary for temporarily overriding the speed control. This increases the operating convenience of such a system and therefore also customer acceptance. Also, because of the design of the buttons, no or only small additional costs for the system are incurred.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A speed control system for a motor vehicle, comprising:

an electronic control unit operatively configured to generate actuation signals for controlling a speed of the motor vehicle to a specified desired speed;

a control element coupled with the electronic control unit, actuation of the control element intervening in speed control and influencing same;

wherein the control element comprises a button configured such that:

(a) when the button is pressed, an intervention in active speed control occurs only for a time duration in which the button is actively being pressed such that no drive torque is generated; and (b) when the button is no longer pressed, original speed control is resumed, wherein, when the intervention in the active speed control for the time duration in which the button is actively being pressed occurs, speed control is completely interrupted.

2. The speed control system according to claim 1, wherein the motor vehicle has an automatic transmission or an automated gearbox;

when the button is pressed, the intervention in the active speed control occurs for the time duration in which the button is pressed such that no drive torque is generated and an interruption in power transmission between an engine and drive wheels of the motor vehicle occurs.

3. The speed control system according to claim 1, wherein the button is configured such that a first intervention influencing the speed control is generated when the button is pressed briefly, and when the button is pressed for a longer time period, the intervention in the active speed control for the time duration in which the button is pressed occurs such that no drive torque is generated and, at an end of the longer time period, original speed control is resumed.

4. The speed control system according to 3, wherein the button operates as a first control element for switching on, switching off and/or interrupting speed control, and when the button is pressed briefly, active speed control is interrupted, interrupted speed control is deactivated and/or deactivated speed control is activated, and when the button is pressed for a longer time period, the intervention in the active speed control for the time duration in which the button is pressed occurs such that no drive torque is generated.

5. The speed control system according to claim 4, wherein the button operates a second control element for specifying a current speed as a new desired speed, and when the button is pressed briefly and speed control is active, the current speed is specified as the new desired speed and/or, if the speed control is interrupted, the speed control is activated to the current speed as the desired speed, and when the button is pressed for a longer time period, the intervention in the active speed control for the time duration in which the button is pressed occurs such that no drive torque is generated.

6. The speed control system according to claim 5, wherein the button is operated as a third control element for reactivating the interrupted speed control to the stored desired speed and/or a stored separation distance, and when the button is pressed briefly, the interrupted speed control is reactivated to the stored desired speed and/or the stored separation, and when the button is pressed for a longer time period, the intervention in the active speed control for the time duration in which the button is pressed occurs such that no drive torque is generated.

7. The speed control system according to claim 3, wherein when the button is pressed for the longer time period, the speed control is completely interrupted for the time duration in which is button is pressed.

8. The speed control system according to claim 4, wherein when the button is pressed for the longer time period, the speed control is completely interrupted for the time duration in which is button is pressed.

9. The speed control system according to claim 5, wherein when the button is pressed for the longer time period, the speed control is completely interrupted for the time duration in which is button is pressed.

10. The speed control system according to claim 6, wherein when the button is pressed for the longer time period, the speed control is completely interrupted for the time duration in which is button is pressed.

11. The speed control system according to claim 3, wherein the vehicle has an automatic transmission or an automated gearbox, and further wherein when the button is pressed for the longer time period, no drive torque is generated and an interruption in power transmission between an engine and drive wheels of the motor vehicle occurs for the time duration in which the button is pressed.

12. The speed control system according to claim 4, wherein the vehicle has an automatic transmission or an automated gearbox, and further wherein when the button is pressed for the longer time period, no drive torque is generated and an interruption in power transmission between an engine and drive wheels of the motor vehicle occurs for the time duration in which the button is pressed.

13. The speed control system according to claim 5, wherein the vehicle has an automatic transmission or an automated gearbox, and further wherein when the button is pressed for the longer time period, no drive torque is generated and an interruption in power transmission between an engine and drive wheels of the motor vehicle occurs for the time duration in which the button is pressed.

14. The speed control system according to claim 6, wherein the vehicle has an automatic transmission or an automated gearbox, and further wherein when the button is pressed for the longer time period, no drive torque is generated and an interruption in power transmission between an engine and drive wheels of the motor vehicle occurs for the time duration in which the button is pressed.

15. The speed control system according to claim 7, wherein the vehicle has an automatic transmission or an automated gearbox, and further wherein when the button is pressed for the longer time period, no drive torque is generated and an interruption in power transmission between an engine and drive wheels of the motor vehicle occurs for the time duration in which the button is pressed.

16. A method of operating a speed control system of a motor vehicle having an electronic control unit that generates actuation signals for controlling a speed of the motor vehicle at least to a specified desired speed, the method comprising the acts of:

providing a control element in the form of a button coupled to the electronic control unit actuation of the button influencing speed control of the speed control system;

generating a first intervention in the speed control when the button is pressed briefly;

when the button is pressed for a longer time period, intervening in active speed control for only the time duration in which the button is actively being pressed such that no drive torque is generated; and when the button is no longer pressed, resuming original speed control, wherein, when the intervention in the active speed control for the time duration in which the button is actively being pressed occurs, speed control is completely interrupted.

* * * * *